US010409609B2

(12) United States Patent
Bonanno et al.

(10) Patent No.: US 10,409,609 B2
(45) Date of Patent: Sep. 10, 2019

(54) AGE MANAGEMENT LOGIC

(71) Applicant: INTERNATIONAL BUSINESS MACHINES CORPORATION, Armonk, NY (US)

(72) Inventors: James J. Bonanno, Wappingers Falls, NY (US); Ashutosh Misra, Karnataka (IN); Anthony Saporito, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 418 days.

(21) Appl. No.: 14/967,902

(22) Filed: Dec. 14, 2015

(65) Prior Publication Data

US 2017/0168824 A1 Jun. 15, 2017

(51) Int. Cl.
*G06F 9/38* (2018.01)

(52) U.S. Cl.
CPC .......... *G06F 9/3838* (2013.01); *G06F 9/3842* (2013.01); *G06F 9/3844* (2013.01); *G06F 9/3855* (2013.01)

(58) Field of Classification Search
None
See application file for complete search history.

(56) References Cited

U.S. PATENT DOCUMENTS

| 6,721,877 | B1 | 4/2004 | Chen et al. | |
|---|---|---|---|---|
| 8,099,566 | B2 | 1/2012 | Luttrell | |
| 8,285,974 | B2 | 10/2012 | Singh et al. | |
| 2003/0188107 | A1* | 10/2003 | Hill | G06F 9/383 |
| | | | | 711/137 |
| 2005/0289305 | A1* | 12/2005 | Chieh | G06F 5/06 |
| | | | | 711/158 |
| 2011/0078697 | A1 | 3/2011 | Smittle et al. | |
| 2012/0260069 | A1 | 10/2012 | Bishop et al. | |
| 2014/0129806 | A1* | 5/2014 | Kaplan | G06F 9/3824 |
| | | | | 712/220 |
| 2016/0350116 | A1* | 12/2016 | Reddy | G06F 9/3806 |

* cited by examiner

*Primary Examiner* — John M Lindlof
(74) *Attorney, Agent, or Firm* — Cantor Colburn LLP; William Kinnaman

(57) ABSTRACT

A system, method and computer program product for maintaining an age and validity of entries in a structure associated with a processor is disclosed. An age tracking matrix is created for the structure. Each row of the age tracking matrix corresponds to an entry of the structure and each column of the age tracking matrix corresponds to an entry of the structure. When initiating an entry: a row corresponding to the entry is determined and a field in the determined row that is on a diagonal of the matrix is marked. For each other field in the determined row, the values that are in a diagonal field that is in a same column of the field are copied into the field. A relative age of the entries is determined by counting a number of marked fields in a column of the age tracking matrix.

14 Claims, 6 Drawing Sheets

AGE MANAGEMENT LOGIC

BACKGROUND

Embodiments of the present invention relate to maintaining an age order of entries in a processor, and more specifically, to maintaining an age management matrix including age and validity information of entries.

Within a microprocessor, it is often necessary to track age information about processor instructions or instruction addresses using entries in a queue-like structure. One such queue-like structure is a speculatively updated branch predictor which tracks multiple occurrences of process branches in a processor pipeline using speculatively updated branch prediction states prior to completion of the occurrences. Similar structures include issue queues for determining which instructions to issue in an out-of-order design, and fetch queues for determining which instruction addresses or data operand addresses to fetch from a cache or search for in a branch predictor. When attempting to predict a direction (taken vs. not-taken) of a most recent occurrence of a branch, it is necessary to select information from a youngest entry in the speculatively updated structure corresponding to that branch. Age management information entered into the structure should be maintained when entries are added and invalidated. Maintaining age management information is particularly challenging when there can be multiple additions and invalidations per cycle and when invalidations can occur in any order. Current structures employ time-consuming and resource-consuming methods for maintaining and tracking age entries. More efficient methods are needed for managing age ordering information incorporating both age and validity for timing-critical applications.

SUMMARY

According to an embodiment of the present invention, a method of maintaining an age and validity of entries in a structure associated with a processor, includes: creating an age tracking matrix for the structure, wherein each row of the age tracking matrix corresponds to an entry of the structure and each column of the age tracking matrix corresponds to an entry of the structure; for each entry, upon initiation of the entry: determining a row corresponding to the entry, marking a field in the determined row that is on a diagonal of the matrix, and for each other field in the determined row, copy to the field the values that are in a diagonal field that is in a same column of the field; determining a youngest entry of the structure by counting a number of marked fields in a column of the age tracking matrix; and performing an action at the processor using the youngest entry.

According to another embodiment of the present invention, a system for maintaining an age and validity of entries in a structure associated with a processor, the system including: a memory having computer readable instructions; and one or more processors for executing the computer readable instructions, the computer readable instructions including: creating an age tracking matrix for the structure, wherein each row of the age tracking matrix corresponds to an entry of the structure and each column of the age tracking matrix corresponds to an entry of the structure; for each entry, upon initiation of the entry: determining a row corresponding to the entry, marking a field in the determined row that is on a diagonal of the matrix, and for each other field in the determined row, copy to the field the markings that are in a diagonal field that is in a same column of the field; determining a youngest entry in the structure by counting a number of marked fields in a column of the age tracking matrix; and performing an action at the processor using the youngest entry.

According to yet another embodiment of the present invention, a computer program product for maintaining an age and validity of entries in a structure associated with a processor, the computer program product including a computer readable storage medium having program instructions embodied therewith, the program instructions executable by a processor to cause the processor to perform: creating an age tracking matrix for the structure, wherein each row of the age tracking matrix corresponds to an entry of the structure and each column of the age tracking matrix corresponds to an entry of the structure; for each entry, upon initiation of the entry: determining a row corresponding to the entry, marking a field in the determined row that is on a diagonal of the matrix, and for each other field in the determined row, copy to the field the markings that are in a diagonal field that is in a same column of the field; determining a youngest entry in the structure by counting a number of marked fields in a column of the age tracking matrix; and performing an action at the processor using the youngest entry.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
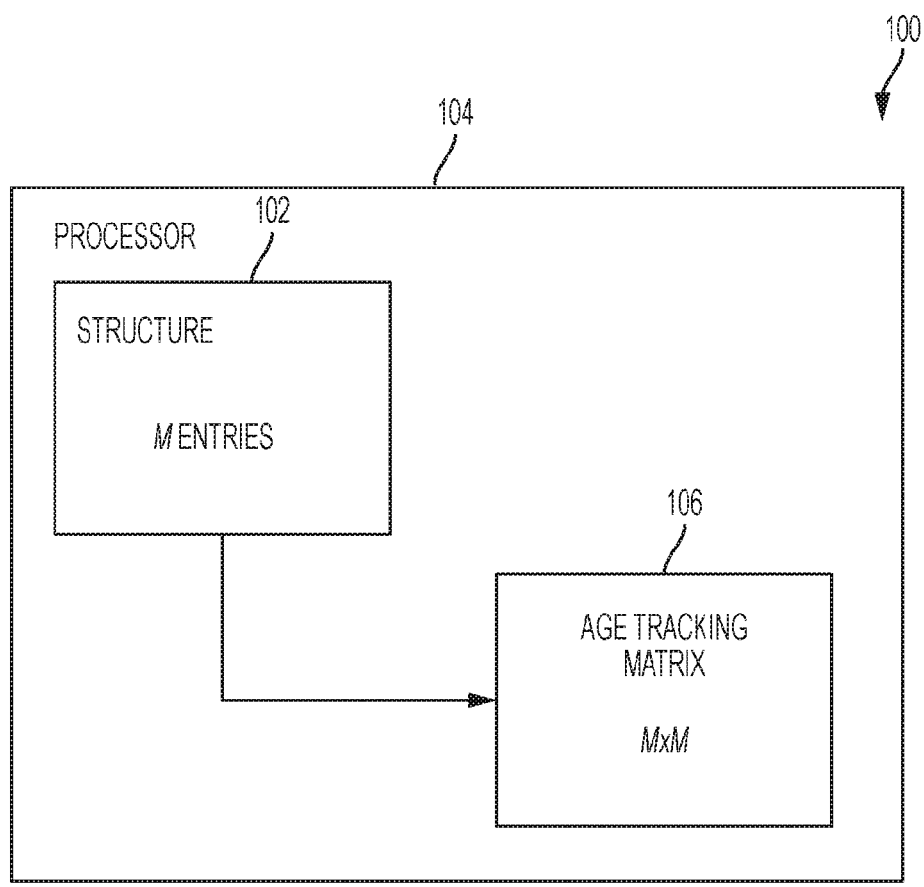
FIG. 1 illustrates a processing system for processing entries in a structure using an age tracking matrix according to an exemplary embodiment of the present invention.

Embodiments of the present invention provide a system and method for determining an age dependent valid entry in a structure containing a plurality of entries in a time-efficient manner. One example of a structure for which an associated age tracking matrix can be used is a speculatively updated branch predictor which tracks multiple occurrences of process branches in a processor pipeline using speculatively updated branch prediction states prior to completion of the occurrences. In various embodiments, the structure can be a speculative branch prediction table, an issue queue, a cache/branch prediction array index queue, etc. The disclosure employs the use of an age tracking matrix that allows reading of ages along the columns and rows of the matrix. Rows of the matrix are assigned to a selected entry and are marked accordingly when its assigned entry is initiated. The method by which rows are filled in upon initiation automatically sets up the columns of the matrix to indicate which entry is the youngest. The method of removing an invalidated entry further maintains information on the youngest entry in the matrix. Therefore, the youngest entry can be determined via a quick binary operation on the columns of the matrix. Age determination is thus quicker and requires less processor time. When the entries are processes or branches of a job, the youngest entry can be provided to a branch predictor which can perform its branch predictions based on the youngest entry.

One example of a structure for which an associated age tracking matrix can be used is a speculatively updated branch predictor which tracks multiple occurrences of process branches in a processor pipeline using speculatively updated branch prediction states prior to completion of the occurrences. Branch prediction is used in microprocessors to predict a direction (taken vs. not-taken) and sometimes a target address of predicted taken branches. This prediction occurs prior to executing the branch instructions and determines the actual branch direction and target address. By predicting this information early, the processor is able to execute along the predicted path while waiting for a branch outcome to be resolved, thereby more efficiently using processor resources and achieving higher performance.

A conventional Branch History Table (BHT) is a table of 2-bit counters associated with branch instruction addresses in a program. Each counter can be in one of 4 possible states: 0 "strongly not-taken", 1 "weakly not-taken", 2 "weakly taken", and 3 "strongly taken". Given a prediction for a particular state, if that occurrence of the branch is resolved taken, the state is incremented by 1 (saturating at the maximum value of 3 if already at 3). Similarly if that occurrence of the branch is resolved not-taken, the state is decremented by 1 (saturating at 0 if already at 0). The BHT is updated non-speculatively once an occurrence of a branch instructions completes after the branch direction and target address have been determined and all older instructions in the program have completed. This delay between predicting branches and updating state in the BHT implies that many occurrences of the same branch can be predicted and can be in flight prior to completion of an oldest occurrence.

A speculative branch history table (SBHT) can be used to track speculatively updated BHT state information for branches in flight. This is a fully associative structure with entries allocated upon predicting a branch (in a state requiring a state change under the assumption that the prediction is correct), and upon resolving a branch and learning that its direction prediction was incorrect. Entries are invalidated when their corresponding branches complete. Entries are also invalidated whenever their corresponding branch instructions get flushed out of the pipeline upon realizing they are on a wrong path—for example as the result of an earlier mal-predicted branch direction or target.

The present invention allows efficient tracking of validity and age ordering of the entries in the speculative BHT structure. Specifically, upon making a branch prediction, the present invention can be used to indicate which entry to select—namely the youngest valid entry in the SBHT corresponding the branch instruction being predicted. The present invention can be used for tracking age and validity for any structure associated with a microprocessor. Other examples of such structures are issue queues for determining which instructions to issue in an out-of-order design, and fetch queues for determining which instruction addresses or data operand addresses to fetch from a cache or search for in a branch predictor.

FIG. 1 illustrates a processing system 100 for processing entries in a structure 102 using an age tracking matrix 106 according to an exemplary embodiment of the present invention. In many operations, the structure 102 includes multiple entries, indicated as M entries. Processor 104 performs operations on the entries of the structure 102. The processor 104 also operates an age tracking matrix 106, as disclosed herein. The age tracking matrix 106 can be used to track the ages and validity of entries of the structure 102 in order to improve the performance of the processor, reduces the time and energy requirements. The size of the age tracking matrix 106 is M×M, where M is the number of entries in structure 102

Figure 2:
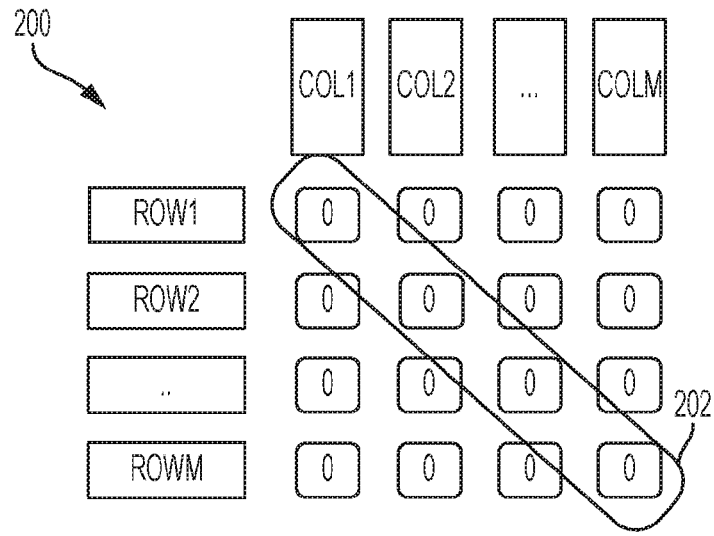
FIG. 2 shows an exemplary age tracking matrix that is used to track entries of the structure in one embodiment of the present invention.

FIG. 2 shows an exemplary age tracking matrix 200 that is used to track entries in the structure 102 associated with a processor (e.g., processor 104 in FIG. 1) in one embodiment of the present invention. The age tracking matrix 200 (also referred to herein as "AgeMatrix") can be a binary matrix, having either '0' or '1' as values in its fields. In the embodiment shown in FIG. 2, an initialized AgeMatrix 200 is shown having only '0' field value in its fields (i.e., no entries of the structure 102 are currently being tracked). The AgeMatrix 200 is an M×M matrix where 'M' is greater than or equal to a total number of entries contained in the structure 102. A field value in the AgeMatrix 200 is indicated by AgeMatrix(i,j), wherein the first index ("i") indicates a row of the matrix and the second index ("j") indicates a column of the matrix. Each row of the AgeMatrix 200 corresponds to one of the entries of structure 102. For example, in one embodiment, row 1 corresponds to entry 1, row 2 corresponds to entry 2, row 3 corresponds to entry 3, and row M corresponds to entry M. Additionally, each column of the AgeMatrix 200 corresponds to one of the entries of structure 102. For example, column 1 corresponds to entry 1, column 2 corresponds to entry 2, column 3 corresponds to entry 3, and column M corresponds to entry M. The construction of AgeMatrix 200 is such that an entry in structure 102 that corresponds to the $m^{th}$ row of AgeMatrix 200 also corresponds to the $m^{th}$ column of AgeMatrix 200. Thus, fields for which the row index and the column index are the same occur along diagonal 202 and are referred to herein as "diagonal fields" of AgeMatrix 200. FIG. 2 shows an initialized AgeMatrix 200 which is populated with '0' in each field (i.e., AgeMatrix(i,j)='0' for all i,j).

FIGS. 3-6 illustrate a method of populating the AgeMatrix 200 in a manner that allows the operator or processor to track youngest and oldest entries in a time-saving and energy-saving manner. In the AgeMatrix 200, tracking the age of an entry in a structure includes the manipulation of field values in rows and columns corresponding to the entry. The dimensions of AgeMatrix 200 are constant during the age tracking process. Additionally, rows and columns corresponding to structure entry remain fixed within the AgeMatrix 200 and are not moved around when the structure entry is initiated or cancelled. Thus, many time-consuming and energy-consuming procedures, such as swapping algorithms, are avoided. While FIG. 2 shows a generalized AgeMatrix 200 that is M×M in dimension, FIGS. 3-6 show only the tracking of only four structure entries for illustrative purposes. Thus, the AgeMatrix 200 is a 4×4 matrix in FIGS. 3-6.

Figure 3:
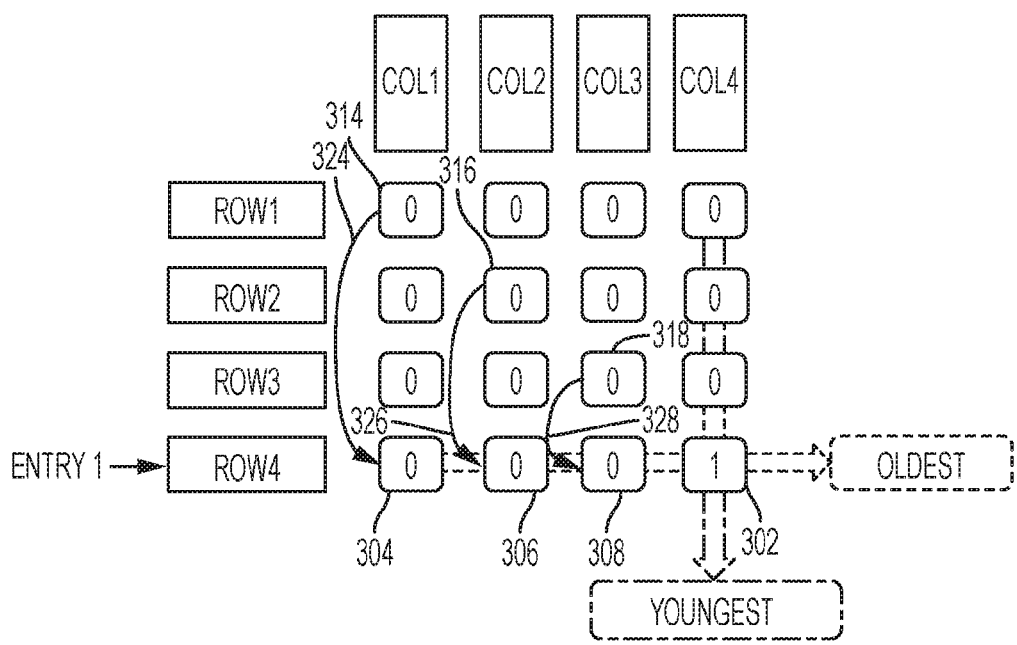
FIG. 3 illustrates a method for tracking a first entry in the age tracking matrix when the first entry is initiated in accordance with an embodiment.

FIG. 3 illustrates a method for tracking a first structure entry in the AgeMatrix 200 when the first structure entry is initiated. When a structure entry is initiated, the row in AgeMatrix 200 corresponding to the structure entry is located or determined. Then, a two-step procedure is followed to populate the fields of the determined row. These two steps can be performed separately or concurrently. In a first step, the field that is a diagonal field in the corresponding row is filled in with a '1' or similar binary entry value. In other words AgeMatrix(n,n)='1', where 'n' is the index of the corresponding row. In a second step, the field values in the other diagonal fields are copied to the fields in the corresponding row, such that the field value in a diagonal field for a selected column is copied to a field in the corresponding row that is in the same selected column. In other words, the copying process {AgeMatrix (i,i)→ AgeMatrix(n,i)} is performed, where 'n' is the index of the corresponding row. This procedure for populating the corresponding row is illustrated in FIG. 3, which shows row 4 (corresponding to entry 1) being populated. Therefore, when initiating the structure entry corresponding to row 4, in the first step the diagonal field 302 of row 4 is filled with '1' (AgeMatrix(4,4)='1'). In the second step: the diagonal field 314 corresponding to row 1, column 1 is copied to the field 304 that is in row 4 (i.e., AgeMatrix(1,1)→ AgeMatrix(4,1)); the diagonal field 316 corresponding to row 2, column 2 is copied to the field 306 of row 2, column 2 (i.e., AgeMatrix (2,2)→ AgeMatrix(4,2)); and the diagonal field 318 corresponding to row 3, column 3 is copied to field 308 in row 4, column 3 (i.e., AgeMatrix(3,3)→ AgeMatrix(4,3)). This copying process is also illustrated by arrows 324, 326 and 328. Arrow 324 illustrates the copying step of AgeMatrix (1,1)→ AgeMatrix(4,1). Arrow 326 illustrates the step of AgeMatrix (2,2)→ AgeMatrix(4,2). Arrow 328 illustrates the step of AgeMatrix (3,3)→ AgeMatrix(4,3). Since no other structure entry are currently running, this copying step yields only '0' values being copied into the fields 304, 306 and 308.

Figure 4:
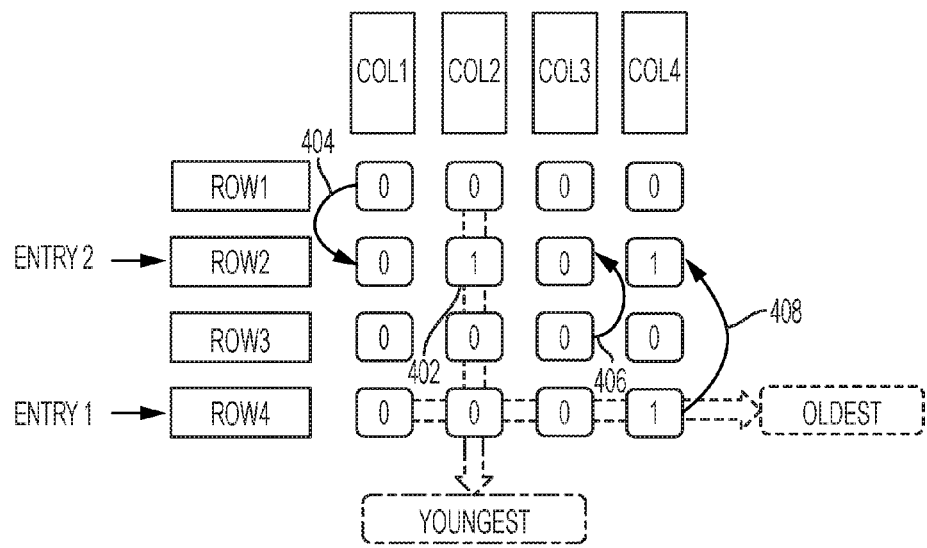
FIG. 4 illustrates initiating a second entry in the age tracking matrix after the first entry has been initiated in accordance with an embodiment.

FIG. 4 illustrates initiating a second structure entry in the AgeMatrix 200 after the first structure entry has been initiated. The second structure entry corresponds to row 2. In the first step, AgeMatrix(2,2) (field 402) is filled with field value '1'. In the second step, the value in diagonal field AgeMatrix (1,1) is copied to AgeMatrix(2,1), the value in diagonal field AgeMatrix(3,3) is copied to AgeMatrix(2,3) and the value in diagonal field AgeMatrix(4,4) is copied to AgeMatrix(2,4). These copying steps are indicated by arrows 404, 406 and 408, respectively. Since the first structure entry has previously been initiated, this leads to a '1' value being copied into AgeMatrix(2,4).

Figure 5:
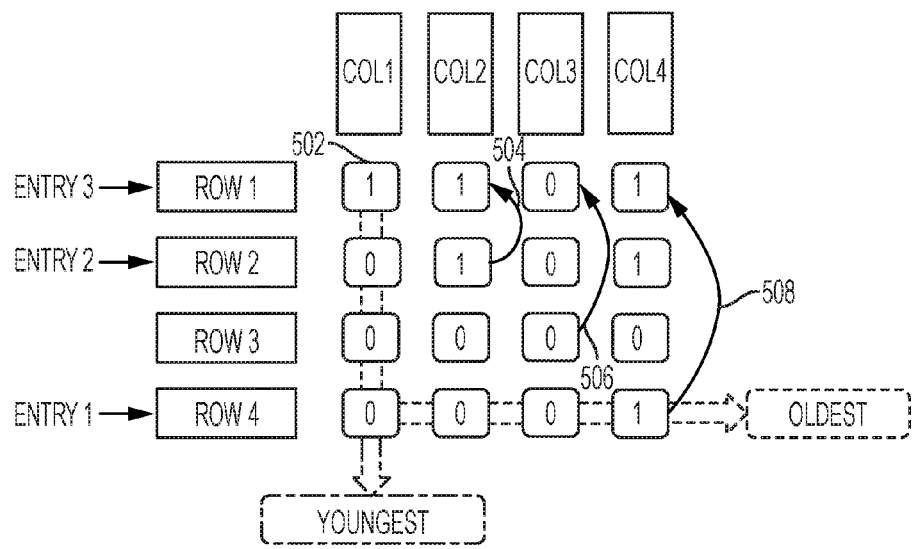
FIG. 5 illustrates initiating a third entry in the age tracking matrix after the first entry and second entry have been initiated in accordance with an embodiment.

FIG. 5 illustrates initiating a third structure entry in the AgeMatrix 200 after the first structure entry and second structure entry have been initiated. The third structure entry corresponds to row 1. (Note, the third entry also corresponds to column 1.) In the first step, AgeMatrix(1,1) (field 502) is filled with field value '1'. In the second step, the value in diagonal field AgeMatrix(2,2) is copied to AgeMatrix(1,2), the value in diagonal field AgeMatrix(3,3) is copied to AgeMatrix(1,3) and the value in diagonal field AgeMatrix (4,4) is copied to AgeMatrix(1,4). These copying steps are indicated by arrows 504, 506 and 508, respectively. Since the first structure entry and second structure entry have been initiated previously, a '1' value is copied into AgeMatrix(1, 2) and a '1' value is copied into AgeMatrix(1,4).

Figure 6:
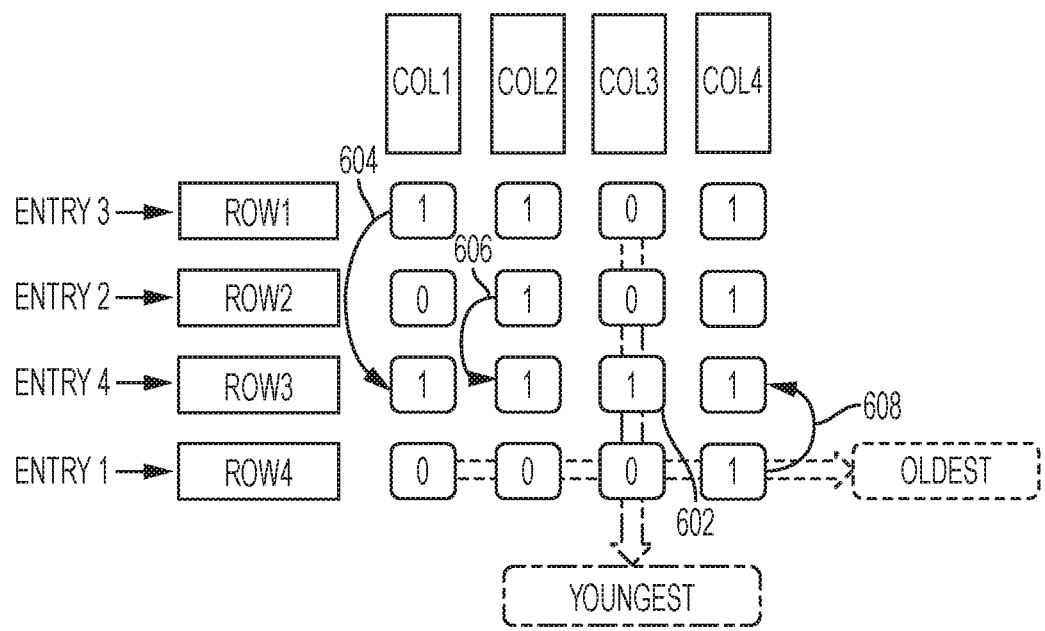
FIG. 6 illustrates initiating a fourth entry in the age tracking matrix after the first, second and third entry have been initiated in accordance with an embodiment.

FIG. 6 illustrates initiating a fourth structure entry in the AgeMatrix 200 after the first, second and third structure entries have been initiated. The fourth structure entry corresponds to row 3. (Note, the fourth structure entry also correspond to column 3.) In the first step, AgeMatrix(3,3) (field 602) is filled with field value '1'. In the second step, the value in diagonal field AgeMatrix(1,1) is copied to AgeMatrix(3,1), the value in diagonal field AgeMatrix(2,2) is copied to AgeMatrix(3,2) and the value in diagonal field AgeMatrix(4,4) is copied to AgeMatrix(3,4). These copying steps are indicated by arrows 604, 606 and 608, respectively. Since the first, second and third structure entry have been initiated previously, '1' values are into AgeMatrix(3,1), AgeMatrix(3,2) and AgeMatrix(3,4).

FIGS. 3-6 may now be reviewed to illustrate how oldest and youngest entries are determined use AgeMatrix 200. The youngest structure entry corresponds to the column that has only one '1' value in the column, with all other values in the column being '0'. A calculation referring to as a 'OneHot' calculation can be applied to each column in order to determine which column is in this state, and therefore which structure entry is the youngest. The oldest structure entry corresponds to the row that has only one '1' value in the row, with all other values in the row being '0'. The 'OneHot' calculation can be applied to each row in order to determine which row is in this state, and therefore which structure entry is the oldest.

Referring back to FIG. 3, performing a OneHot calculation on each row indicates that Row 4 has only one '1' value and that Column 4 has only one '1' value. This indicates that structure entry 1 (corresponding to row 4) is the oldest structure entry being run and that structure entry 1 (corresponding to column 4) is also the youngest structure entry. This is evident in the fact that structure entry 1 is the only structure entry being run.

Referring now to FIG. 4, performing a OneHot calculation on each row indicates that Row 4 (corresponding to structure entry 1) has only one '1' value. Therefore, structure entry 1 is the oldest structure entry being run. A OneHot calculation on each column indicates that Column 2 (corresponding to structure entry 2) is has only one '1' value. Therefore, structure entry 2 is the youngest structure entry being run.

Referring now to FIG. 5, performing a OneHot calculation on each row indicates that Row 4 (corresponding to structure entry 1) has only one '1' value. Therefore, structure entry 1 is the oldest structure entry being run. A OneHot calculation on each column indicates that Column 1 (corresponding to structure entry 3) is has only one '1' value. Therefore, structure entry 3 is the youngest structure entry being run.

Referring now to FIG. 6, performing a OneHot calculation on each row indicates that Row 4 (corresponding to structure entry 1) has only one '1' value. Therefore, entry 1 is the oldest structure entry being run. A OneHot calculation on each column indicates that Column 3 (corresponding to structure entry 4) is has only one '1' value. Therefore, structure entry 4 is the youngest structure entry being run.

It is to be noted that the second youngest structure entry can also be tracked using a calculation that determines which column has only two occurrences of a '1' value.

Similarly, the second oldest structure entry can be tracked using a calculation that determines which row has only two occurrences of a '1' value.

Figure 7:
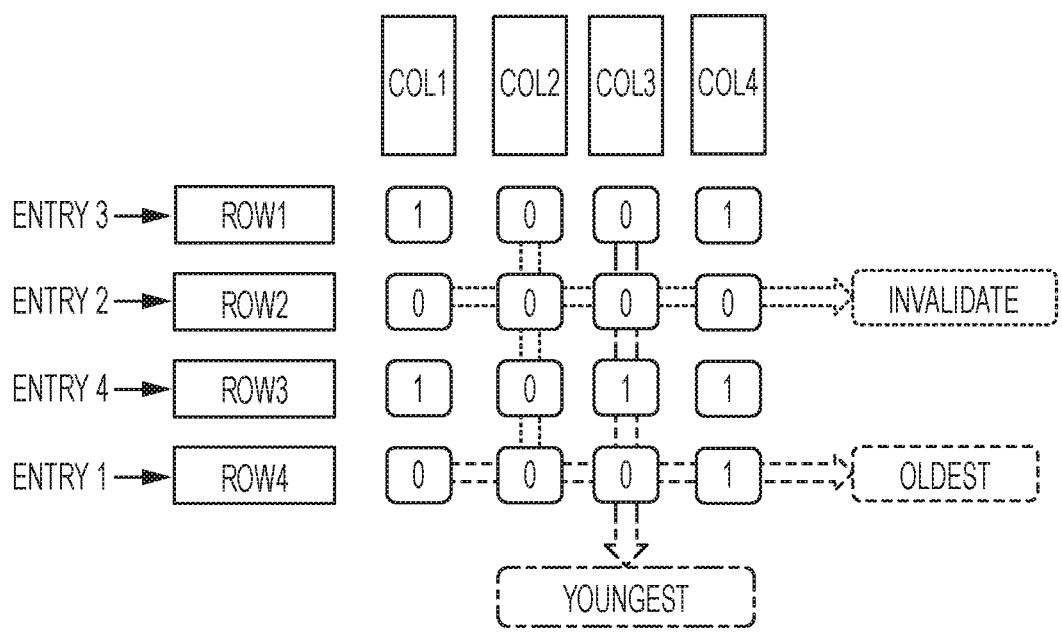
FIG. 7 illustrates a first cancellation of an entry from the age tracking matrix in accordance with an embodiment.
Figure 8:
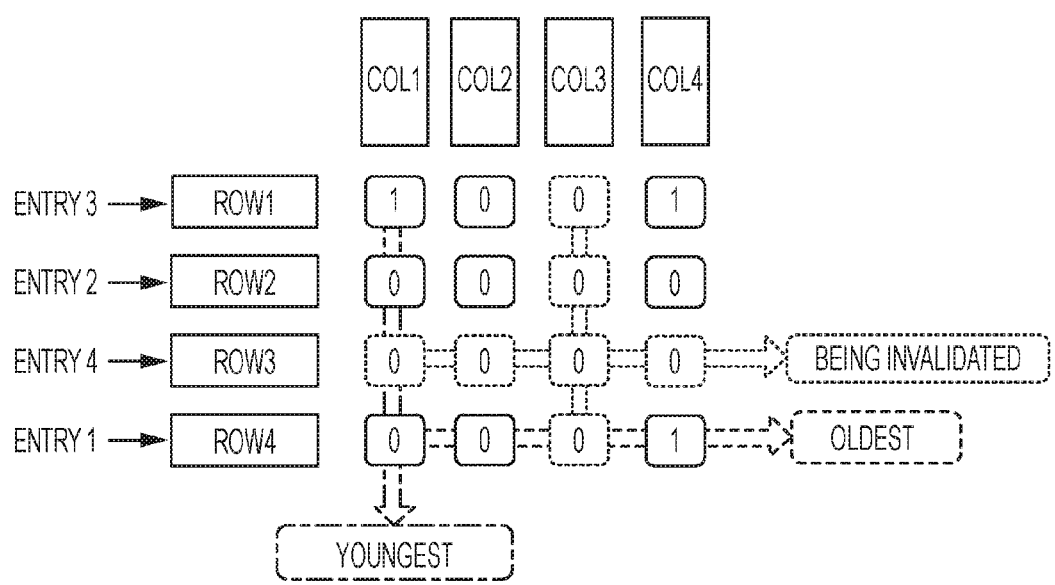
FIG. 8 illustrates second cancellation of an entry from the age tracking matrix in accordance with an embodiment.

FIGS. 7-8 illustrate operations of the AgeMatrix 200 when a structure entry is invalidated or otherwise cancelled from the AgeMatrix 200. When a structure entry is invalidated, '0' values are placed in the fields of each row corresponding to the structure entry and of each column corresponding to the structure entry. In FIG. 7, the structure entry 2 (corresponding to row 2 and to column 2) is removed from the age matrix shown in FIG. 6 by placing '0' in all of the fields of row 2 and all of the fields of column 2. Using the OneHot calculations illustrated in FIGS. 3-6, it is evident that structure entry 1 (corresponding to row 4) is still the oldest structure entry and structure entry 4 (corresponding to column 3) remains the youngest structure entry.

FIG. 8 illustrates cancellation of another structure entry from AgeMatrix 200. The structure entry 4 (corresponding to row 3 and to column 3) is removed from the age matrix shown in FIG. 7 by placing '0' in all of the fields of row 3 and all of the fields of column 3. Using the OneHot calculations disclosed herein, it is evident that structure entry 1 (corresponding to row 4) is still the oldest structure entry and structure entry 3 (corresponding to column 1) is now the youngest structure entry.

The use of AgeMatrix 200 to track structure entry ages simplifies the logic used in determining structure entry ages. Additionally, management of the AgeMatrix 200 is simplified. The number of procedural steps required to maintain the AgeMatrix 200 is significantly fewer than the steps required for maintenance of other age tracking methods. Invalidation of structure entries is also performed by a simple method of changing the values of fields for the row and column corresponding to the structure entry, rather than removing or shifting a field entry for the structure entry. Since there is no shifting of field entries, the AgeMatrix 200 requires less dynamic power consumption. Additionally, the method can be scaled to any size project or any number or types of structures. Age order can be maintained for multiple structure entries and branch addresses. The youngest structure entry in the AgeMatrix 200 can be provided to a branch history table to allow the table to perform a branch prediction using the youngest structure entry.

Figure 9:
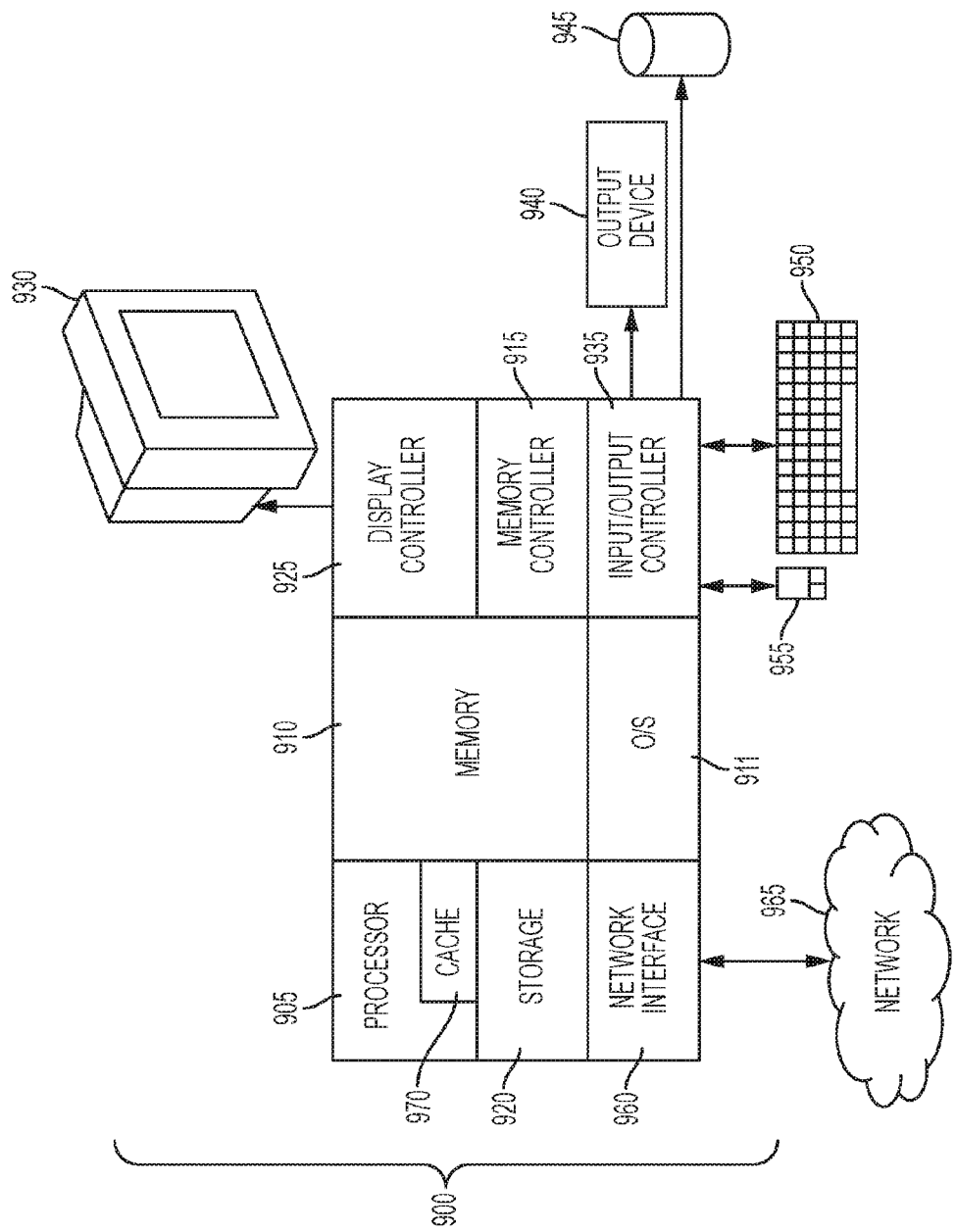
FIG. 9 depicts a block diagram of a computer system for implementing some or all aspects of the system, according to some embodiments of this disclosure.

FIG. 9 illustrates a block diagram of a computer system 900 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 900, such as a personal computer, workstation, minicomputer, or mainframe computer.

In some embodiments, as shown in FIG. 9, the computer system 900 includes a processor 905, memory 910 coupled to a memory controller 915, and one or more input devices 945 and/or output devices 940, such as peripherals, that are communicatively coupled via a local I/O controller 935. These devices 940 and 945 may include, for example, a printer, a scanner, a microphone, and the like. Input devices such as a conventional keyboard 950 and mouse 955 may be coupled to the I/O controller 935. The I/O controller 935 may be, for example, one or more buses or other wired or wireless connections, as are known in the art. The I/O controller 935 may have additional elements, which are omitted for simplicity, such as controllers, buffers (caches), drivers, repeaters, and receivers, to enable communications.

The I/O devices 940, 945 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 905 is a hardware device for executing hardware instructions or software, particularly those stored in memory 910. The processor 905 may be a custom made or commercially available processor, a central processing unit (CPU), an auxiliary processor among several processors associated with the computer system 900, a semiconductor based microprocessor (in the form of a microchip or chip set), a microprocessor, or other device for executing instructions. The processor 905 includes a cache 970, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 970 may be organized as a hierarchy of more cache levels (L1, L2, etc.).

The memory 910 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 910 may incorporate electronic, magnetic, optical, or other types of storage media. Note that the memory 910 may have a distributed architecture, where various components are situated remote from one another but may be accessed by the processor 905.

The instructions in memory 910 may include one or more separate programs, each of which comprises an ordered listing of executable instructions for implementing logical functions. In the example of FIG. 9, the instructions in the memory 910 include a suitable operating system (OS) 911. The operating system 911 essentially may control the execution of other computer programs and provides scheduling, input-output control, file and data management, memory management, and communication control and related services.

Additional data, including, for example, instructions for the processor 905 or other retrievable information, may be stored in storage 920, which may be a storage device such as a hard disk drive or solid state drive. The stored instructions in memory 910 or in storage 920 may include those enabling the processor to execute one or more aspects of the systems and methods of this disclosure.

The computer system 900 may further include a display controller 925 coupled to a display 930. In some embodiments, the computer system 900 may further include a network interface 960 for coupling to a network 965. The network 965 may be an IP-based network for communication between the computer system 900 and an external server, client and the like via a broadband connection. The network 965 transmits and receives data between the computer system 900 and external systems. In some embodiments, the network 965 may be a managed IP network administered by a service provider. The network 965 may be implemented in a wireless fashion, e.g., using wireless protocols and technologies, such as WiFi, WiMax, etc. The network 965 may also be a packet-switched network such as a local area network, wide area network, metropolitan area network, the Internet, or other similar type of network environment. The network 965 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 900, such as that illustrated in FIG. 9.

Technical effects and benefits include the use of simplified age management logic. The invention provides an easy invalidation procedure for multiple and/or concurrent entries. Furthermore, no shifting of entries (i.e., rows, columns) is performed, leading to less dynamic power consumption. Youngest and oldest entries can be tracked as well as second youngest and second oldest entries. The built-in redundancy of the age tracking matrix can be useful in Reliability, Availability and Serviceability protection. In other words, there can only be one column/row which is identified as youngest/oldest using the OneHot calculation. Age order can be maintained for multiple branch addresses.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of maintaining an age and validity of entries for a plurality of structures associated with a processor, comprising:
    creating an age tracking matrix for the plurality of structures, wherein each structure corresponds to an address, wherein each row of the age tracking matrix corresponds to an entry of one of the plurality of structures and each column of the age tracking matrix corresponds to an entry of one of the plurality of structures;
    for each entry of a structure selected from the plurality of structures, upon initiation of the entry:
        determining a row corresponding to the entry of the selected structure,
        marking a field in the determined row that is on a diagonal of the matrix by entering '1' value in the field, and
        for each other field in the determined row, copy to the field the values that are in a diagonal field that is in a same column of the field;
    for each entry, upon invalidation of the entry of the selected structure:
        entering '0' in each field of the row corresponding to the invalidated entry and,
        entering '0' in each field of the column corresponding to the invalidated entry;
        determining a youngest entry of the selected structure by counting a number of marked fields in a column of the age tracking matrix corresponding to the selected structure and by determining an entry whose corresponding column includes only one field having value of '1'; and;
    performing a branch prediction at the processor using the youngest entry of the selected structure, wherein the age tracking matrix maintains age order for multiple structure entries and multiple branch addresses.

2. The method of claim 1, wherein the age tracking matrix is an M×M matrix, wherein M is greater than or equal to a number of entries of the structure.

3. The method of claim 1, wherein the age tracking matrix is a binary matrix.

4. The method of claim 1, wherein a '0' entry in a diagonal field of the row indicates an invalid entry of the structure.

5. The method of claim 1, further comprising updating a state of a branch history table based on the youngest entry.

6. A system for maintaining an age and validity of entries for a plurality of structures associated with a processor, the system comprising:
    a memory having computer readable instructions; and
    one or more processors for executing the computer readable instructions, the computer readable instructions comprising:
        creating an age tracking matrix for the plurality of structures, wherein each structure corresponds to an address, wherein each row of the age tracking matrix corresponds to an entry of one of the plurality of structures and each column of the age tracking matrix corresponds to an entry of one of the plurality of structures;
        for each entry of a structure selected from the plurality of structures, upon initiation of the entry:
            determining a row corresponding to the entry of the selected structure,
            marking a field in the determined row that is on a diagonal of the matrix by entering '1' value in the field, and for each other field in the determined row, copy to the field the markings that are in a diagonal field that is in a same column of the field;

for each entry of the selected structure, upon invalidation of the entry:

entering '0' in each field of the row corresponding to the invalidated entry and, entering '0' in each field of the column corresponding to the invalidated entry;

determining a youngest entry in the selected structure by counting a number of marked fields in a column of the age tracking matrix corresponding to the selected structure and by determining an entry whose corresponding column includes only one field having value of '1'; and performing a branch prediction at the processor using the youngest entry or the selected structure, wherein the age tracking matrix maintains age order for multiple structure entries and multiple branch addresses.

7. The system of claim 6, wherein the age tracking matrix is an M×M matrix, wherein M is greater than or equal to the number of entries of the structure being tracked.

8. The system of claim 6, wherein the age tracking matrix is a binary matrix.

9. The system of claim 6, wherein a '0' value in a diagonal field of the row indicates an invalid entry of the structure.

10. The system of claim 6, further comprising updating a state of a branch history table based on the youngest entry.

11. A computer program product for maintaining an age and validity of entries for a plurality of structure associated with a processor, wherein each structure corresponds to an address, the computer program product comprising a computer readable storage medium having program instructions embodied therewith, the program instructions executable by a processor to cause the processor to perform:

creating an age tracking matrix for the plurality of structures, wherein each structure corresponds to an address, wherein each row of the age tracking matrix corresponds to an entry of one of the plurality of structures and each column of the age tracking matrix corresponds to an entry of one of the plurality of structures;

for each entry of a structure selected from the plurality of structures, upon initiation of the entry:

determining a row corresponding to the entry of the selected structure, marking a field in the determined row that is on a diagonal of the matrix by entering '1' value in the field, and for each other field in the determined row, copy to the field the markings that are in a diagonal field that is in a same column of the field;

for each entry, upon invalidation of the entry of the selected structure:

entering '0' in each field of the row corresponding to the invalidated entry and, entering '0' in each field of the column corresponding to the invalidated entry;

determining a youngest entry in the selected structure by counting a number of marked fields in a column of the age tracking matrix and by determining an entry whose corresponding column includes only one field having value of '1'; and performing a branch prediction at the processor using the youngest entry of the selected structure, wherein the age tracking matrix maintains age order for multiple structure entries and multiple branch addresses.

12. The computer program product of claim 11, wherein the age tracking matrix is an M×M matrix, wherein M is greater than or equal to the number of entries in the structure.

13. The computer program product of claim 11, wherein a '0' value in a diagonal field of the row indicates an invalid entry.

14. The computer program product of claim 11, further comprising updating a state of a branch history table based on the youngest entry.

\* \* \* \* \*